United States Patent
Madoch et al.

(10) Patent No.: US 6,741,693 B1
(45) Date of Patent: *May 25, 2004

(54) METHOD OF OPERATING A VIRTUAL PRIVATE NETWORK

(75) Inventors: Pitsa Madoch, Glenview, IL (US); Wayne Robert Heinmiller, Elgin, IL (US); Christopher Michael LeBeau, Arlington Heights, IL (US); John Wesley Moss, Lake Zurich, IL (US); Dianna Inara Tiliks, Elk Grove, IL (US); Walter Martin Malinowski, Naperville, IL (US)

(73) Assignee: SBC Properties, L.P., Reno, NV (US)

( * ) Notice: Subject to any disclaimer, the term of this patent is extended or adjusted under 35 U.S.C. 154(b) by 728 days.

This patent is subject to a terminal disclaimer.

(21) Appl. No.: 09/599,843

(22) Filed: Jun. 22, 2000

(51) Int. Cl.[7] .............................. H04M 7/00; H04M 3/42
(52) U.S. Cl. .............................. 379/220.01; 379/207.02; 379/230
(58) Field of Search .................... 379/219, 220.01, 379/221.01, 221.08–221.1, 221.15, 229, 230, 901, 207.02

(56) References Cited

U.S. PATENT DOCUMENTS

| | | | | |
|---|---|---|---|---|
| 4,348,554 A | * | 9/1982 | Asmuth | 379/112.09 |
| 4,797,913 A | * | 1/1989 | Kaplan et al. | 379/91.02 |
| 4,972,464 A | * | 11/1990 | Webb et al. | 379/114.02 |
| 5,212,691 A | * | 5/1993 | Hokari | 370/384 |
| 5,247,571 A | * | 9/1993 | Kay et al. | 379/221.09 |
| 5,475,749 A | * | 12/1995 | Akinpelu et al. | 379/221.02 |
| 5,515,427 A | * | 5/1996 | Carlsen et al. | 379/201.05 |
| 5,517,562 A | * | 5/1996 | McConnell | 379/201.03 |
| 5,539,817 A | * | 7/1996 | Wilkes | 379/230 |
| 5,892,821 A | * | 4/1999 | Turner | 379/221.08 |
| 5,903,639 A | * | 5/1999 | Lipchock et al. | 379/221.08 |
| 5,917,899 A | * | 6/1999 | Moss et al. | 379/221.08 |
| 5,974,133 A | * | 10/1999 | Fleischer et al. | 379/230 |

* cited by examiner

Primary Examiner—Benny Tieu
(74) Attorney, Agent, or Firm—Law Office of Dale B Halling, LLC

(57) ABSTRACT

A method of operating a virtual private network includes the steps of: (a) dialing a custom number; (b) receiving the custom number at a switch (20) of a first carrier; (c) routing the call to a switch (18) of a second carrier based on having received the custom number; and (d) when the call to the switch (18) of the second carrier includes a plain old telephone number translation of the customer number, routing the call over the second carrier to a service switching point (26) of a third carrier.

8 Claims, 4 Drawing Sheets

METHOD OF OPERATING A VIRTUAL PRIVATE NETWORK

FIELD OF THE INVENTION

The present invention relates generally to the field of telecommunications and more particularly to a method of operating a virtual private network.

BACKGROUND OF THE INVENTION

Companies often use abbreviated dialing plans at a location. This allows the user to dial an internal number (abbreviated number) to reach other people within the same location. Virtual private networks (VPN) have allowed companies having several locations in the same Local Access and Transport Area (LATA) to share the abbreviated dialing plan. The VPN allows the various locations of a company to also provide other features such as call transfer, multiway calling, and call forwarding. A company that decides to use a VPN can provide all these features without buying expensive Private Branch Exchanges (PBX) for each location and without having to lease lines between each of the locations. This has provided the customer with flexibility and cost savings over setting up a standard private network. Unfortunately, companies that have locations in two or more LATAs could not use a VPN to provide these services. This is because the present regulatory environment requires two or more carriers when connecting two separate LATAs using the Public Switched Telephone Network (PSTN). As a result, these customers were required to lease lines between the LATAs and use access codes for the various locations, to obtain services similar to a VPN.

Thus there exists a need for a method of operating a virtual private network that works across several LATAs and several service providers.

SUMMARY OF THE INVENTION

A method of operating a virtual private network that overcomes these and other problems includes the steps of: (a) dialing a custom number; (b) receiving the custom number at a switch of a first carrier; (c) routing the call to a switch of a second carrier based on having received the custom number; and (d) when the call to the switch of the second carrier includes a plain old telephone number translation of the customer number, routing the call over the second carrier to a service switching point of a third carrier.

DETAILED DESCRIPTION OF THE DRAWINGS

Figure 1:
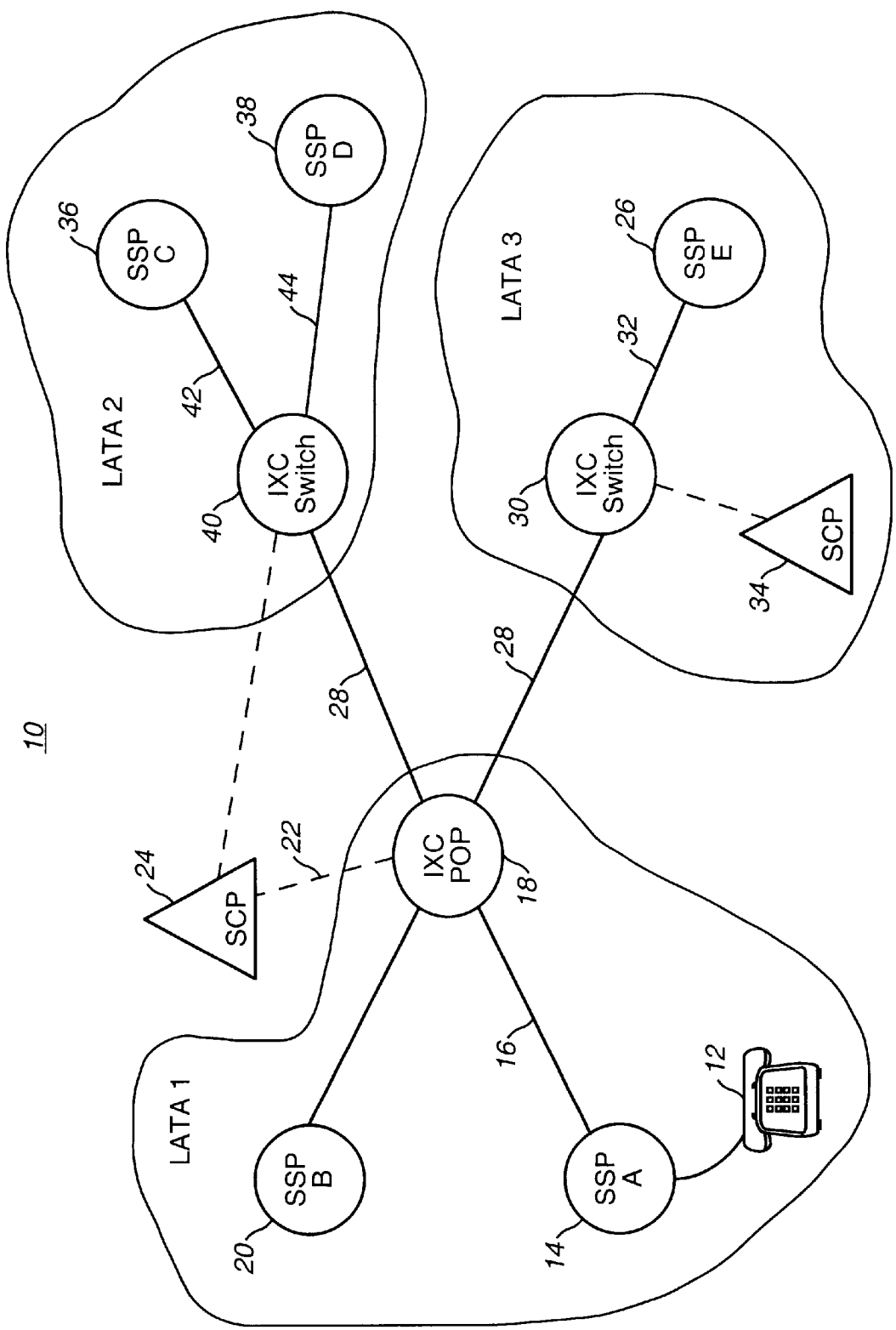
FIG. 1 is a schematic diagram of an embodiment of a virtual private network.

FIG. 1 shows a schematic diagram of an embodiment of a virtual private network 10. In this embodiment, the provider of the virtual private network 10 is not the local provider in LATA-1, LATA-2 or LATA-3. When a customer dials an on-network telephone number from a telephone 12 in LATA-1 of an originating carrier, a service switching point (SSP-A) 14 receives the dialed number. A service switching point is an intelligent network switch. The on-network number can be 4–11 digit number and the customer does not have to dial an access code before dialing the on-network number. The SSP-A 14 performs a number identifier operation to determine if the call should be routed over a private line 16 to an intermediate carrier switch 18. The number identification operation is performed in one embodiment by comparing the received number with a predefined set of numbers. In one embodiment, the predefined set of numbers includes all the on-network telephone numbers for a particular virtual private network. When the number belongs to the predefined set of numbers, then the call is routed to the intermediate carrier switch 18. In one embodiment the intermediate carrier switch 18 is an interexchange carrier (IXC) point of presence (POP) switch. The intermediate carrier switch 18 is connected to other SSPs, such as SSP-B 20.

The intermediate carrier switch 18 is connected by an intelligent network 22 to a network carrier Service Control Point (SCP) 24. A SCP provides a number of intelligent functions, including routing and billing information for calls to a SSP. When the intermediate carrier switch 18 receives the call over the private line 16, it encounters a custom dialing plan trigger. The intermediate carrier switch 18 then sends a query over the intelligent network 22 to the SCP 24. The query (information analyzed query) will include at least the calling party directory number (calling party telephone number) and the dialed digits (on-network telephone number). The SCP 24 will analyze the query and return a message including routing instructions. The message will include at least the plain old telephone number translation (directory number) of the on-network number. In another embodiment the message will include a signaling indication and may also include primary trunk group, secondary trunk group, primary carrier and alternate carrier. The primary trunk group defines a particular line (private line) over which the call should be routed if possible. The primary carrier defines a preferred interexchange carrier over which the call should be routed if possible.

Upon receiving the message and routing instructions the intermediate switch 18 routes the call based on the routing instructions. If the customer at telephone 12 dialed an on-network number of a facility connected to SSP-E 26 (terminating service switching point) in LATA-3, the call would be routed through the intermediate carrier's network 28 to an intermediate switch 30. When the message includes the signaling indication, the call is routed by the intermediate switch to the SSP-E 26 over a private line 32. The SSP-E 26 then routes the call to the called customer.

When the message does not include the signaling indication, the intermediate switch 30 triggers on the plain old telephone number. The intermediate switch 30 sends a query (routing query) to a second service control point (SCP) 34. The routing query includes the plain old telephone number and the calling telephone number. The SCP 34 then determines if the plain old telephone number and the calling telephone number belong to the same virtual private network. When the plain old telephone number and the calling telephone number belong to the same virtual private network, then the call is routed over a private line 32. When the plain old telephone number and the calling telephone number do not belong to the same virtual private network, the call is routed over public facilities to SSP-E.

If the customer at telephone 12 dialed an on-network number of a facility connected to SSP-C 36 or SSP-D 38 in LATA-2, the intermediate switch 18 would route the call through the intermediate carrier's network 28 to an intermediate switch 40. In one embodiment the intermediate carrier's network is a private line connecting the switches 18, 40. The intermediate switch 40 in one embodiment then routes the call over public facilities to SSP-C 36 or SSP-D 38. In another embodiment, the signaling indication tells the switch 40 to route the call over private facilities 42, 44 to SSP-C 36 or SSP-D 38. As explained above the intermediate switch 40, in one embodiment, triggers on the call and sends a query to the SCP 24 to determine if the plain old telephone number and the calling number are part of the same virtual private network. When the numbers are part of the same virtual private network, the intermediate switch 40 routes the call over private lines 42, 44. Using the method described above, a virtual private network connecting facilities connected to SSP-A 14, SSP-B 20, SSP-C 36, SSP-D 38, SSP-E 26 has been described. The virtual private network works across multiple LATAs and multiple service providers.

Figure 2:
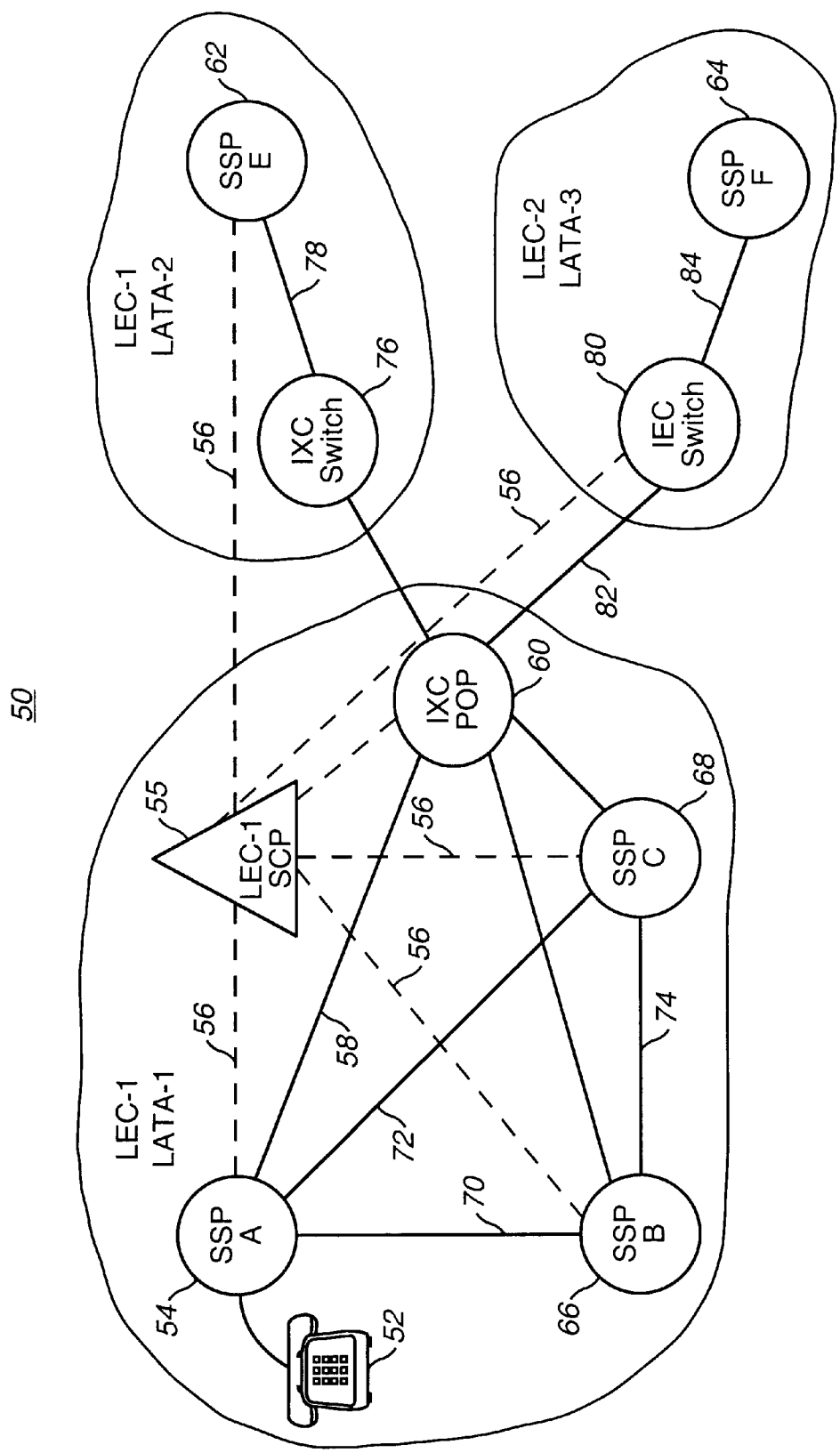
FIG. 2 is a schematic diagram of an embodiment of a virtual private network.

FIG. 2 shows a schematic diagram of another embodiment of a virtual private network 50. In this case the call originates from LATA-1 having local exchange carrier (LEC-1). In this embodiment, the network carrier providing the virtual private network service is the same as LEC-1. A user dials a number (on-network number) on telephone 52 to initiate a call. SSP-A 54 of the first carrier (LEC-1) receives the number. The SSP-A 54 triggers on the number and sends a query to the network service control point (SCP) 55 over an intelligent network 56. The query includes the number dialed. The SCP 55 responds with a plain old telephone number translation of the number and a signaling indication in one embodiment. The SSP-A 54 then routes the call over a private line 58 to a switch 60 of an intermediate carrier (second carrier), when the call is directed to facilities connected to either SSP-E 62 in LATA-2 or SSP-F 64 in LATA-3. When the call is directed to facilities in LATA-1 (first local access and transport area), such as SSP-B 66 or SSP-C 68, SSP-A 54 in one embodiment contains sufficient information to route the call over private facilities 70, 73 to SSP-B 68 or SSP-C 68. Note that SSP-B and SSP-C 68 are connected by private facilities 74. In another embodiment, SSP-A 54 sends a query to SCP 55 and then routes the call over public or private facilities to SSP-B 66 or SSP-C 68.

The switch 60 routes the call based on the plain old telephone number (POTS) through the second carrier to a switch 76, when the call is to facilities connected to SSP-E 62. When the SCP 55 included a signaling indication in its routing message, then the switch 76 routes the call over private facilities 78 to SSP-E 62. When the SCP 55 did not include the signaling indication in its routing message, the switch 76 routes the call over public facilities to SSP-E 62 based on the POTS translation of the dialed number.

When the call is directed to a facility connected to SSP-F 64, the switch 60 routes the call through the second carrier's network to a switch 80. In one embodiment, the switch 60 is connected to switch 80 by a private line 82. In one embodiment, the switch 80 routes the call over public facilities to SSP-F 64, based upon the POTS number. In another embodiment the switch 80 routes the call over private facilities 84 to SSP-F, based upon the signaling indication. In yet another embodiment, the switch 80 routes the call over private facilities 84 after sending a query to SCP 55. The SCP 55 determines that the calling party and called party are part of the same virtual private network.

Figure 3:
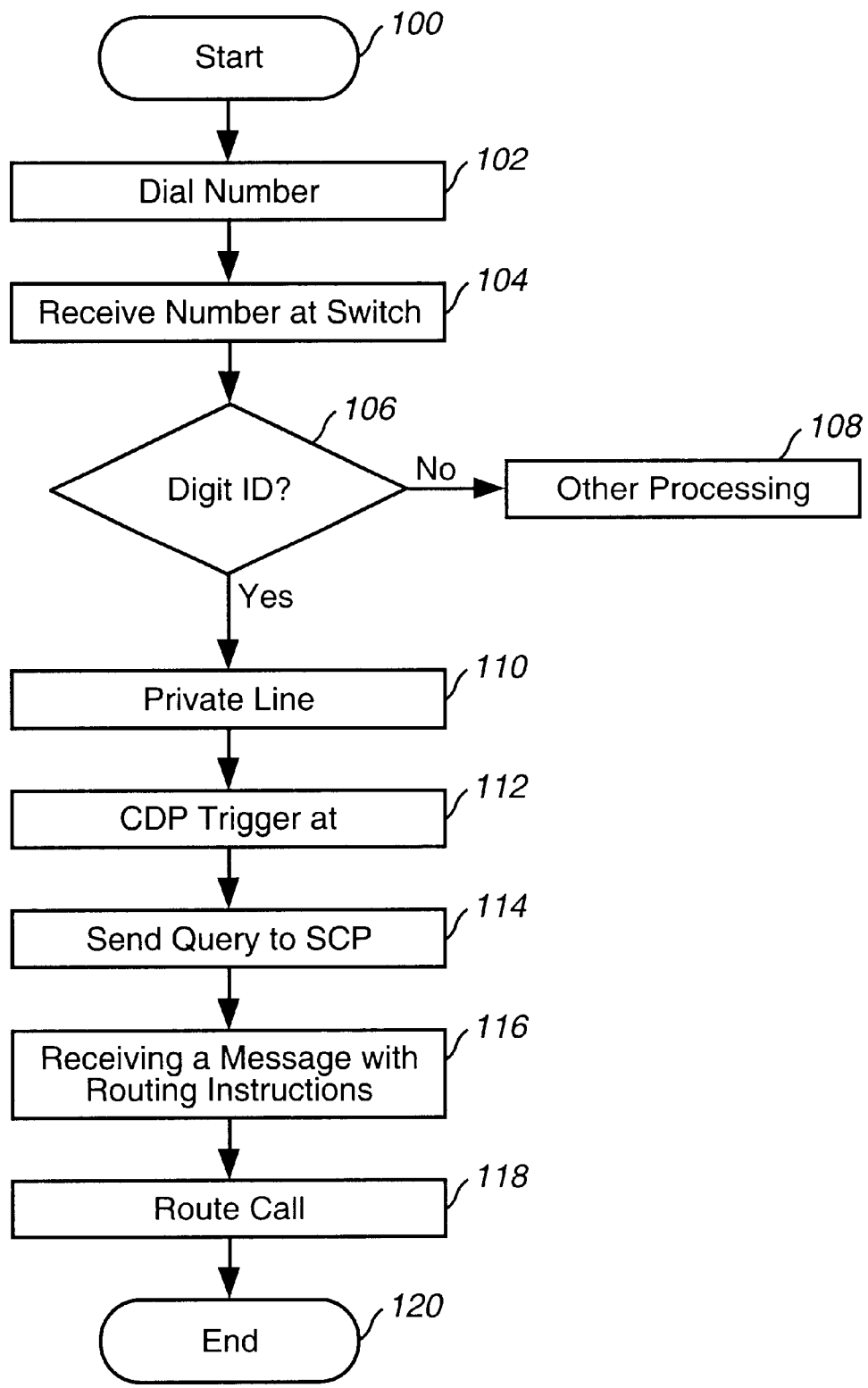
FIG. 3 is a flow chart of an embodiment of the steps used in operating a virtual private network.

FIG. 3 is a flow chart of an embodiment of the steps in used in operating a virtual private network. The process starts, step 100, by a user dialing a number at step 102. The number is received at an switch at step 104. At step 106 it is determined if the dialed number belongs to predefined set of numbers. When the number does not belong to the predefined set of numbers (predetermined group of numbers), then other processing is performed at step 108. When the number does belong to the predefined set of numbers (predetermined set), the call is routed over a private line at step 110. At step 112, a custom dialing plan (CDP) trigger is performed at an intermediate carrier switch. The intermediate carrier switch sends a query to a network SCP at step 114. At step 116, the switch receives a message (response) including routing instructions. The call is routed using the routing instructions at step 118, which ends the process at step 120.

Figure 4:
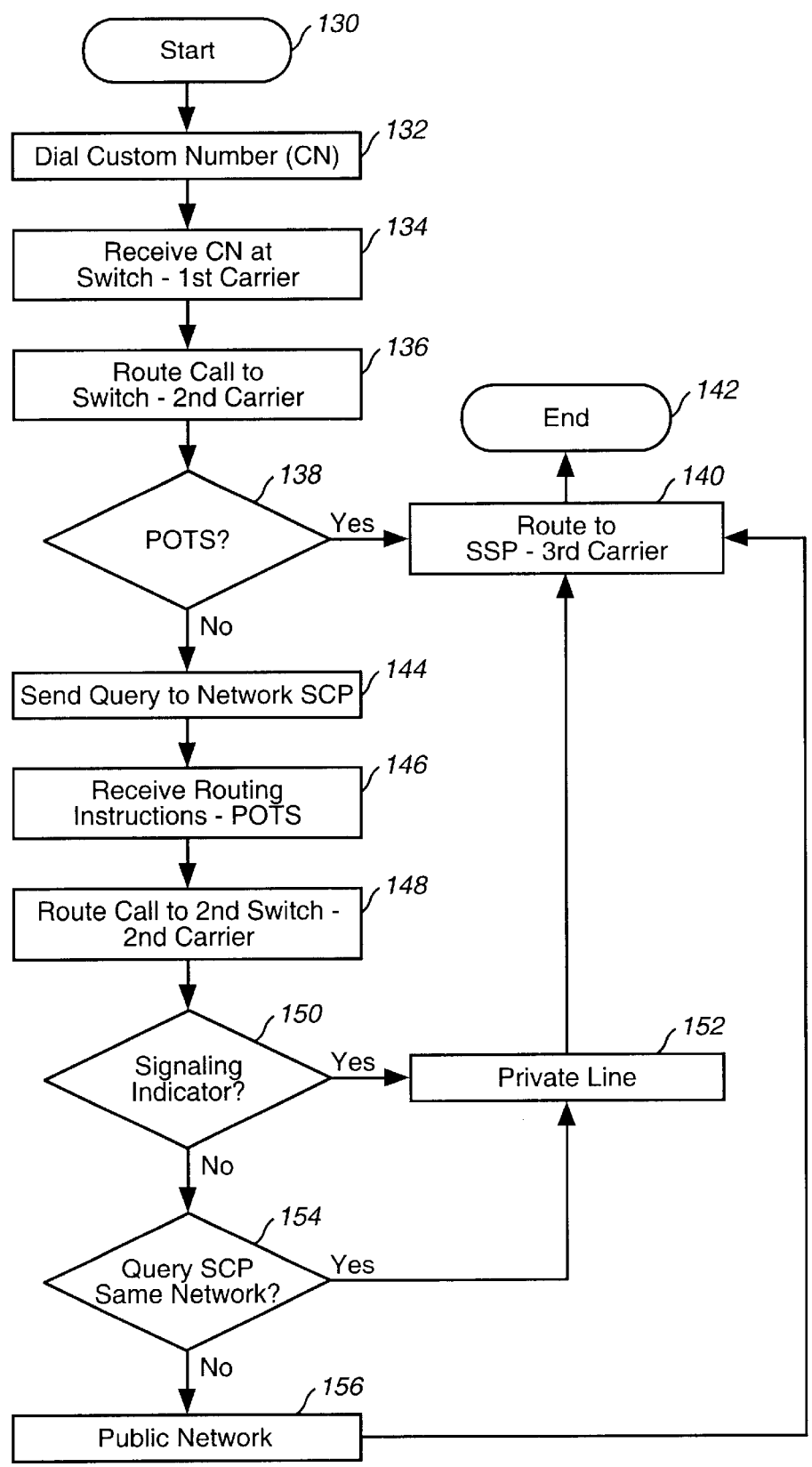
FIG. 4 is a flow chart of an embodiment of the steps used in operating a virtual private network.

FIG. 4 is a flow chart of another embodiment of the steps in used in operating a virtual private network. The process starts, step 130, when a customer number is dialed at step 132. A custom number is a number that does not conform to a standard number or dialing plan (e.g., the North American Numbering Plan). The customer number is received at a first carrier's switch at step 134. The SSP routes the call to a switch at a second carrier at step 136. The switch determines if the call includes a plain old telephone number translation of the custom number at step 138. When the call does include the a plain old telephone (POTS) number translation of the custom number, the call is routed to a SSP of a third carrier (terminating carrier) based on the POTS number at step 140, which ends the process at step 142.

When the call does not include the POTS number translation of the custom number, the switch of the second carrier sends a query to a network SCP at step 144. Note that the network SCP can be part of the first carrier, second carrier, third carrier or part of a separate carrier. The switch then receives routing instructions including the POTS number translation of the custom number at step 146. Based on the POTS number the call is routed to a second switch of the second carrier at step 148. Next, it is determined if the call includes a signaling indicator (received signaling indicator) at step 150. When the signaling indicator is included, the call is routed over a private line at step 152. The call is connected to the SSP of the third carrier at step 140, which ends the process at step 142.

When the signaling indicator is not included, a query is sent to a second SCP to determine if the POTS number and the originating number are part of the same virtual private network at step 154. When the POTS number and the originating number are part of the same virtual private network, the call is routed over a private line at step 152. The call is connected to the SSP of the third carrier at step 140, which ends the process at step 142. When the POTS number and the originating number are not part of the same virtual private network, the call is routed over the public network at step 156. The call is received at the SSP in the third carrier at step 140, which ends the process at step 142.

Thus there has been described a method of operating a virtual private network works across several LATAs and several service providers. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method of operating a virtual private network, comprising the steps of:
   (a) receiving a number at a service switching point of a first carrier;

(b) sending a query to a service control point;

(c) receiving a response containing a routing instructions including a plain old telephone number translation of the number;

(d) routing a call over a private line to a switch of an intermediate carrier;

(e) routing the call based on the routing instructions.

2. The method of claim 1, wherein step (e) further includes the steps of:

(e1) routing the call over the private line from the intermediate carrier to a service switching point of a terminating carrier.

3. The method of claim 1, wherein step (a) consists of receiving four dialed digits.

4. A method of operating a virtual private network, comprising the step of:

(a) receiving a number at a service switching point of a first carrier;

(b) sending a query to a service control point;

(c) receiving a billing information (d) routing a call over a private line to a switch of an intermediate carrier; and (e) routing the call over the private line from the intermediate carrier to a service switching point of a terminating carrier.

5. The method of claim 4, wherein step (b) further includes the step of:

(b1) receiving a response containing a routing instructions.

6. The method of claim 5, wherein step (b) further includes the step of:

(b2) receiving a response containing a plain old telephone number translation of the number.

7. The method of claim 5, wherein step (b1) consists of receiving a signaling indicator as part of the routing instructions.

8. The method of claim 7, wherein step (e) further includes the steps of:

(e1) determining if the routing instructions include the signaling indicator; and (e2) when the routing instructions include the signaling indicator, routing the call over the private line.

* * * * *

UNITED STATES PATENT AND TRADEMARK OFFICE
CERTIFICATE OF CORRECTION

PATENT NO. : 6,741,693 B1
DATED : May 25, 2004
INVENTOR(S) : Madoch, et al.

It is certified that error appears in the above-identified patent and that said Letters Patent is hereby corrected as shown below:

Title page,
Item [*] Notice, should read:
-- This patent is subject to a terminal disclaimer disclaiming the terminal portion of any patent granted on this application which would extend it beyond the expiration date of US patent No. 6,141,409. --

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,741,693 B1 |
| APPLICATION NO. | : 09/599843 |
| DATED | : May 25, 2004 |
| INVENTOR(S) | : Madoch et al. |

It is certified that error appears in the above-identified patent and that said Letters Patent is hereby corrected as shown below:

Col. 1, lines 1: insert --This is a continuation of copending US application Serial No. 08/969,598, filed on 11/13/97, which application is hereby incorporated by reference herein.--

Signed and Sealed this

Thirtieth Day of November, 2010

David J. Kappos
*Director of the United States Patent and Trademark Office*